United States Patent [19]
Buzbee et al.

[11] Patent Number: 5,365,578
[45] Date of Patent: Nov. 15, 1994

[54] METHOD AND SYSTEM FOR TRANSFERRING SPECIAL CIRCUIT TELEPHONE PAIRS

[75] Inventors: James M. Buzbee; Douglas R. Connally, both of Mineral Wells; Wayne Matthews, Dennison, all of Tex.

[73] Assignee: Industrial Technology, Mineral Wells, Tex.

[21] Appl. No.: 962,485

[22] Filed: Oct. 15, 1992

[51] Int. Cl.[5] .................... H04M 11/00; H04M 1/24; H04M 3/00

[52] U.S. Cl. ......................................... 379/96; 379/1; 379/20; 379/21; 379/273; 379/93

[58] Field of Search ...................... 379/20, 21, 27, 273, 379/93-32, 221, 279, 96; 370/13; 340/825.9

[56] References Cited

U.S. PATENT DOCUMENTS

| | | | |
|---|---|---|---|
| 3,975,600 | 8/1976 | Marston | 379/21 |
| 4,186,283 | 1/1980 | Simmonds | 379/21 |
| 4,590,336 | 5/1986 | Ray et al. | 379/20 |

OTHER PUBLICATIONS

"Special Circuit Transfer System", APC Industries, Inc. 3M, undated, 6 pages.
"831A Special Circuit Transfer System Model 1170" Instruction Manual, Automation Products Company, May 1981, pp. title-57.
"Take It Easy-T1 Protection's Here", by Albert H. Miller, Feb. 1, 1991, Telephone Engineer & Management, pp. 72-78.

*Primary Examiner*—Curtis Kuntz
*Assistant Examiner*—Jason Chan
*Attorney, Agent, or Firm*—Geoffrey A. Mantooth

[57] ABSTRACT

The system has two units for transferring a telephone circuit from an old pair to a new pair between two locations. Each unit has a carrier amplitude measuring circuit to determine which location has the larger carrier amplitude and therefore which is the upstream location. Each unit has a charge switch, two transfer switches in the form of an old pair switch and a new pair switch and a controller for controlling the switches. One of the units closes its charge switch to charge the new pair to the dc level of the old pair. Then, the upstream unit operates its two transfer switches at the same time to switch from the old pair, by opening the old pair switch, to the new pair, by closing the new pair switch. The upstream unit transmits a signal to the downstream unit on a third pair. When the downstream unit receives the signal, it operates its two transfer switches at the same time to complete the transfer from the old pair to the new pair.

20 Claims, 2 Drawing Sheets

METHOD AND SYSTEM FOR TRANSFERRING SPECIAL CIRCUIT TELEPHONE PAIRS

FIELD OF THE INVENTION

The present invention relates to methods and apparatuses for transferring telephone cable pairs, and in particular for transferring special circuit telephone cable pairs.

BACKGROUND OF THE INVENTION

Telephone systems have traditionally used copper wires to carry telephone signals. Originally, a pair of wires was used to carry a single conversation, at audio frequencies. However, the capacity of a pair of wires can be increased through the use of special circuitry such as multiplexing, wherein the pair of wires carries multiple conversations. One type of multiplexing uses a digital carrier signal. The audio information is digitized and sent over the wires on the digital carrier signal. These special circuits utilize digital carrier signals with bit rates ranging between 56,000 bits to 3.1 megabits per second. Examples of standard digital carriers that have been adapted by the telephone industry are T-1 and T-2, which utilize pulse code modulation.

Special telephone circuits often must be transferred from old wires or cables to new wires or cables. This may be because the old cable carrying the special circuit has been damaged. Alternatively, system upgrades may require rerouting away from the old cable. The new cable is used to bypass the damaged or unwanted section of the old cable.

With ordinary audio frequency circuits, one prior art transfer procedure is to splice the new cable to the old cable at a first end of the new cable. Then, the other or second end of the new cable is spliced to the old cable. The new cable forms a bridge across the old section of cable lying between the splices. This old section of cable is then cut out from the circuit.

Thus, with audio frequencies, the new cable can be spliced one end at a time to the old cable. This procedure does not disrupt the telephone circuit because at audio frequencies, the new cable only looks like a small lumped capacitor, which does not interrupt telephone service on the old cable. However, at the higher frequencies used in digital carrier circuits, problems can arise if the new cable is spliced one end at a time to the old cable. This is because at high frequencies, the unterminated new cable can appear electrically to the telephone circuit as a short circuit or an open circuit at certain frequencies. This can severely distort or even interrupt telephone service on the old cable.

Prior art techniques reduce disruption of telephone service during the transfer of special circuits by attempting to connect both ends of the new cable to the old cable at the same time. This is performed by coordinating the electrical connection of the new cable at both of its ends. In Marston, U.S. Pat. No. 3,975,600 and Ray, U.S. Pat. No. 4,590,336, a master transfer unit is provided at one end of the new cable, while a slave transfer unit is provided at the other end of the new cable. In general, the master unit electrically disconnects the old cable and then electrically connects the new cable. The master unit sends a message to the slave unit to perform the same type of switching. When the slave unit receives the message, it disconnects the old cable and then connects the new cable.

In spite of the coordination efforts of the prior art, we have discovered that there is still some disruption to telephone service. One problem is due to the fact that at each unit, the old cable is first disconnected, thus breaking the telephone circuit, followed by the connection of the new cable. Reed relays are used to perform the switching. The relays exhibit a switching time that is long compared to the carrier bit rate. Thus, this switching procedure results in lost data. Furthermore, the relays exhibit contact bounce, further increasing the switching time and the amount of data loss.

Another problem is that when the new cable is connected to the old cable, it has a dc potential of zero volts. The old cable is at some non-zero dc level as a result of its carrying the special circuit. Connecting the new cable to the old cable produces a mismatch that results in charging the new cable. Charging produces transients, which can corrupt the digital data being transmitted.

Still another problem is that the data located between the two units is frequently lost during the transfer. We have discovered that the prior art switches special circuits without regard to the direction of data travel. Data typically travels in one direction on a special circuit. When the downstream unit is switched first, the data on the old cable continues to travel from the upstream unit to the downstream unit, only to be lost. The odds of the prior art switching the downstream unit first are about even. Thus, for about 50% of the transfers, the downstream unit is switched first, resulting in lost data.

SUMMARY OF THE INVENTION

It is an object of the present invention to provide a method and an apparatus for transferring special telephone circuits in such a way so as to minimize the disruption of telephone service.

The present invention provides a method for transferring a special telephone circuit between first and second locations from a first set of conductors to a second set of conductors, with the first set of conductors carrying data thereon. The method includes connecting, at a first location, a first location switch in parallel with a first portion of said first set of conductors which is to be cut and connecting the first location switch between the first and second sets of conductors. At a second location, a second location switch is connected in parallel with a second portion of said first set of conductors which is to be cut and is connected between the first and second sets of conductors. The data on the first set of conductors is routed through the respective switches. The direction of data travel between the first and second locations along the first set of conductors is determined so as to determine which location is an upstream location and which location is a downstream location. Then the upstream switch is switched first so as to transfer data from the first set of conductors to the second set of conductors at the upstream location. When an end of data on the first set of conductors arrives at the downstream location, the downstream switch is switched so as to transfer data from the first set of conductors to the second set of conductors at the downstream location.

The method can determine the direction of data travel by measuring the amplitude of a carrier carrying the data on the first set of conductors at both the first and second locations. The measured amplitudes are compared to determine which amplitude is larger. The location with the large amplitude is designated as the upstream location.

The method can also include the step of charging the second step of conductors to the dc voltage level of the first set of conductors before transferring data from the first set of conductors to the second set of conductors.

The method can also include the step of providing first and second switches for each of the first and second location switches. The method then coordinates, at each location, the operation of the respective first and second switches by opening the respective first switch at the same time that the respective second switch is closed.

An apparatus of the present invention is provided for transferring a special telephone circuit from a first set of conductors to a second set of conductors. The apparatus includes a first switch structured and arranged to be located between the first set of conductors and the second set of conductors. An impedance is connected in series with the first switch. The impedance is of a value that blocks the telephone circuit while passing dc therethrough. A second switch is structured and arranged to be connected in parallel with a portion of the first set of conductors which is to be cut. A third switch is structured and arranged to be connected in parallel with the first switch in the impedance. There is a means for controlling the operation of the first, second and third switches. The means for controlling is coupled with the first, second and third switches. The means for controlling initially closes the second switch while opening the first and third switches so as to route the telephone circuit through the second switch. The means for controlling then closes the first switch so as to charge the second set of conductors with a dc voltage that appears on the first set of conductors. The means for controlling then closes the third switch and opens the second switch at the same time so as to transfer the special telephone circuit from the first set of conductors to the precharged set of conductors.

A system in accordance with the present invention is for transferring a special telephone circuit between first and second locations from a first set of conductors to a second set of conductors. The system includes a first unit adapted to be located at the first location and a second unit adapted to be located at the second location. Each of the first and second units includes a switch that is adapted to be connected in parallel with a respective portion of said first set of conductors which is to be cut and also adapted to be connected between the first set of conductors and the second set of conductors at the respective location, and means for controlling the respective switch. The means for controlling transfers the special telephone circuit from the first set of conductors to the second set of conductors. There is also provided means for determining which of the first or second locations is upstream relative to data flow in the first set of conductors. There is a means for operating the means for controlling the switch of the respective unit located at the upstream location first before operating the means for controlling the respective unit located at the downstream location is operated. This transfers the telephone circuit at the upstream location first before transferring the telephone circuit at the downstream location.

The system can be made to further provide that the means for operating further includes means for transmitting a signal along a third set of conductors from the upstream location to the downstream location at the same time that the upstream means for controlling operates the upstream switch. The means for operating also includes means for receiving said signal at said downstream location, wherein when the respective unit located at the downstream location receives the signal, the downstream means for controlling operates the downstream switch.

The system can be made to further provide that the switch in each unit includes first and second switches, with the first switch connected in parallel to the portion of the first set of conductors which is to be cut and the second switch is connected between the first and second sets of conductors. Each of the means for controlling initially closes the respective first switch and opens the respective second switch so as to route the telephone circuits through the respective first switches. Each of the means for controlling then simultaneously opens the first switch and opens the second switch so as to switch the telephone circuit from the first set of conductors to the second set of conductors at the respective location.

The system can also provide that one of the first and second units further includes a third switch that is adapted to be connected in parallel with the second switch and an impedance connected in series with the third switch. The respective means for controlling also controls the third switch so that the third switch is closed to charge the second set of conductors to the same dc level as the first set of conductors before switching the telephone circuit from the first set of conductors to the second set of conductors.

One aspect of the present invention is that the new pair is charged to the same dc potential as the old pair before the telephone circuit is transferred. Precharging occurs through the first switch and the R, L impedances. This precharging of the new pair eliminates charging transients that ordinarily occur with prior art systems that charge the new pair only after switching the telephone circuit onto the new pair. These charging transients by prior art systems can corrupt the data being carried by the telephone circuit. The present invention maintains the integrity of the data by eliminating charging transients when the telephone circuit is transferred to the new pair.

Another aspect of the present invention is the elimination of open circuit time during the transfer from the old pair to the new pair. Prior art systems use reed relays to make the transfer. Relays provide a temporary circuit when moving the reed from the old pair contacts to the new pair contacts. In addition, relay reeds exhibit contact bounce after the relay reeds touch the new pair contacts. It typically takes one to three milliseconds for the reed contact bounce to settle out, after which the reeds make good electrical contact with the new pair of contacts. Thus, during the switching process, relays exhibit a break in the telephone circuit due to travel time of the reeds from the old pair contacts to the new pair contacts and also due to contact bounce. This break in the telephone circuit results in a loss of data being carried by the telephone circuit.

The present invention eliminates these problems associated with relays by using solid state switches and closely coordinating their operation. The microprocessor operates the second and third switches so that as the second switch (connected to the old pair) is opened, the third switch (connected to the new pair) is simultaneously closed. The present invention effectively eliminates any open circuit time in the switching process.

Another aspect of the present invention is the identification of the upstream location and the use of this information to transfer the telephone circuit with a minimal loss of data. Special telephone circuits typically transmit data in one direction along a pair of conductors. Prior art systems do not account for the direction of data flow when transferring telephone circuits. Thus, in about half of the transfer operations, the prior art systems transfer the downstream end first. This results in a loss of the data that is located between the upstream and downstream ends during the transfer process.

The present invention identifies the upstream unit and transfers the telephone circuit at the upstream unit first. The upstream and downstream units are synchronized so that the downstream unit switches from the old pair to the new pair at the same time that the first bits of data on the new pair and the last bits of data on the old pair arrive at the downstream unit. Thus, the old pair is allowed to "empty" its data through the downstream end before the downstream end is switched, resulting in a minimal amount of data loss.

DESCRIPTION OF PREFERRED EMBODIMENT

Figure 1:
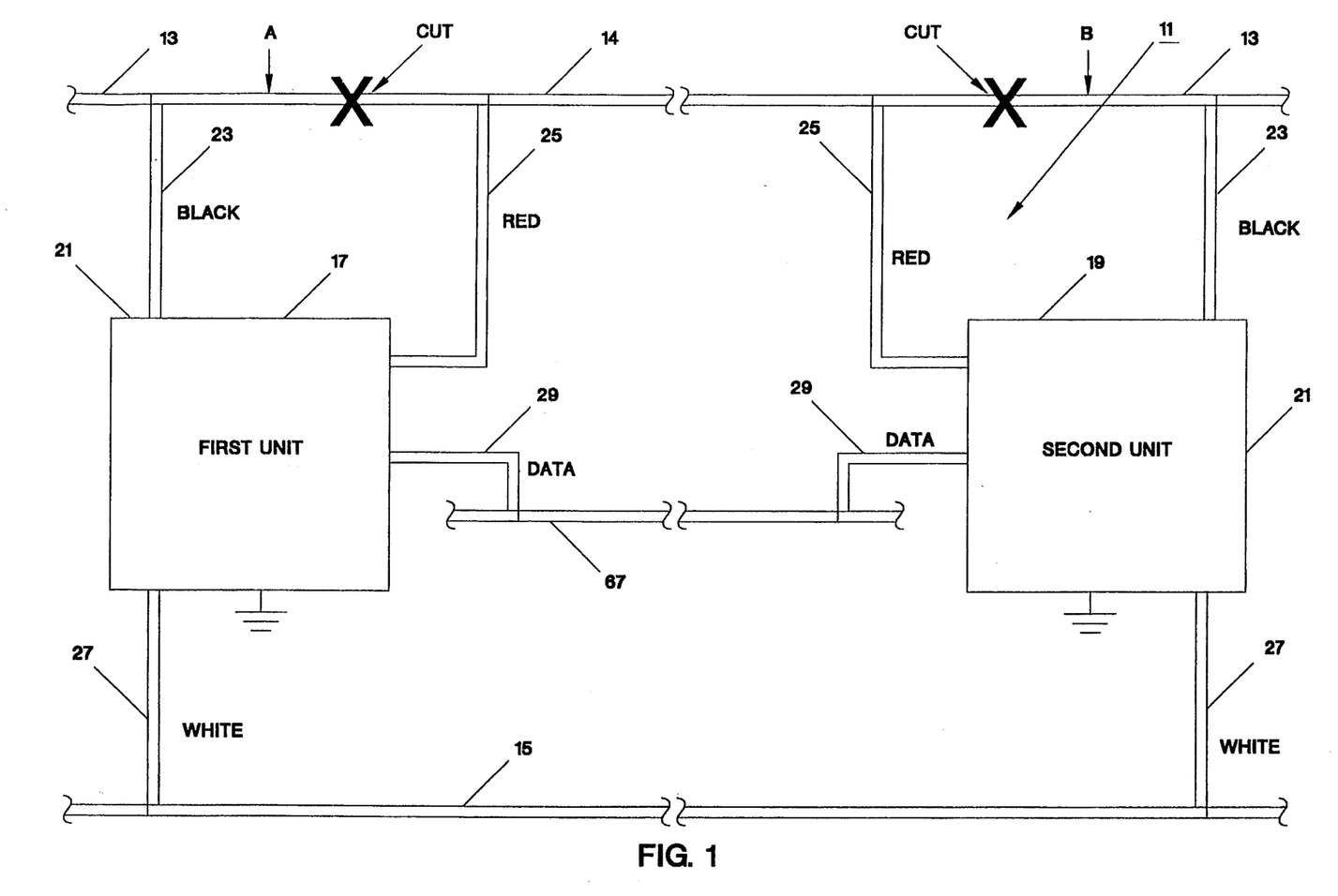
FIG. 1 is a block diagram showing the system of the present invention, in accordance with a preferred embodiment, connected to telephone cable pairs.

In FIG. 1, there is shown a block diagram of the system 11 of the present invention, in accordance with a preferred embodiment, connected to telephone conductor pairs. The system is used to transfer telephone circuits from a first pair of wires 13 (hereinafter referred to as an "old pair") to a second pair of wires 15 (hereinafter referred to as a "new pair"). The new pair of wires 15 will replace that portion 14 of the old pair of wires that extends between locations A and B. Each of the old and new pairs includes a ring conductor and a tip conductor. The old and new pairs may be located in a single cable, or the old pair may be located in one cable while the new pair may be located in another cable. Frequently, in fact, entire cables must be transferred, wherein telephone service is transferred from an old cable to a new cable. The system of the present invention transfers special telephone circuits with a minimum amount of disturbance to the telephone circuits and their signals.

The system 11 in the present invention includes a first unit 17 and a second unit 19. The first unit 17 is located at the location A along the old pair of wires 13, while the second unit 19 is located at the location B along the old pair. The first and second units 17, 19 are substantially similar to each other.

Figure 2:
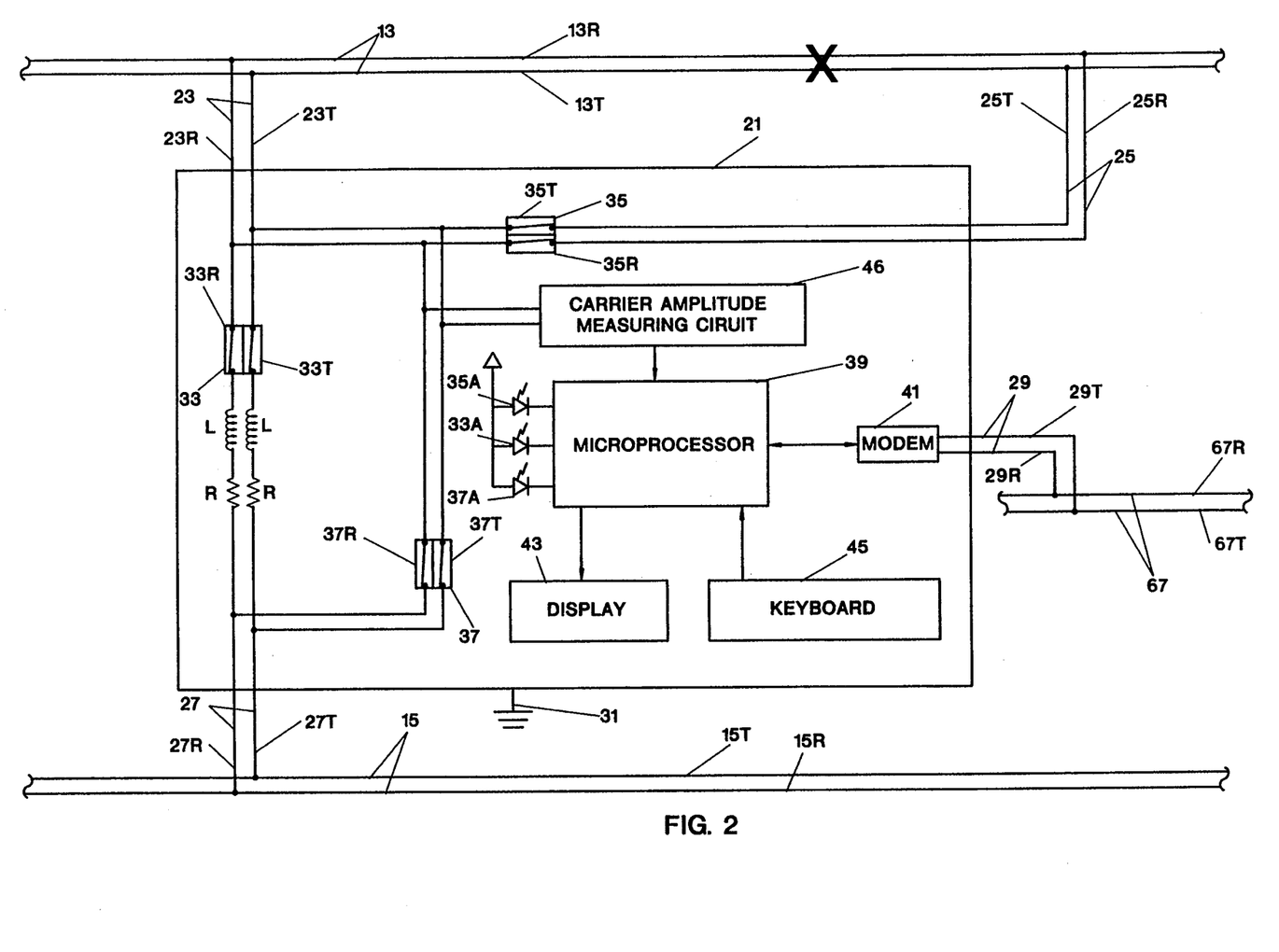
FIG. 2 is a block diagram of one of the units of the present invention.

Referring to FIG. 2, which shows one of the units 17, 19, each unit includes a housing 21 and electrical circuits located inside of the housing. The units are mobile so that a field technician can move them from place to place. Each unit has a self contained power supply (not shown). Extending from the housing are a first pair of connection leads 23, a second pair of connection leads 25, a third pair of connection leads 27, a fourth pair of connection leads 29 and a ground wire 31. Each pair has a ring connection lead for connection to a ring conductor and a tip connection lead for connection to a tip conductor. Each of the connection leads have clips on their ends to facilitate their connection to either the old or new pairs. It is industry practice to assign the following nomenclature and coloring to these pairs of connection leads: the first pair of connection leads 23 is a black cord, the second pair of connection leads 25 is a red cord, and the third pair of connection leads 27 is a white cord. For this patent application, the fourth pair of connection leads 29 will be referred to as the data cord.

Inside of the housing, there are provided plural solid state switches. In the preferred embodiment, each switch is a double pole single throw switch. A charge switch 33 is connected in series with the black cord 23 and the white cord 27 such that there is provided one set of contacts connected in series with each of the black connection leads. Thus, there is one set of contacts 33R connected in series with the black and white ring connection leads 23R, 27R and another set of contacts 33T connected in series with the black and white tip connection leads 23T, 27T. Connected in series with each set of contacts is a resistance R and an inductance L, which impedances serve to block ac signals. An old pair switch 35 is connected in series with the black cord 23 and the red cord 25 such that there is provided one set of contacts connected in series with each of the black connection leads. Thus, there is one set of old pair switch contacts 35R connected in series with the black and red ring connection leads and the other set of old pair switch contacts 35T connected in series with the black and red tip connection leads. A new pair switch 37 is connected in parallel across the first switch 33. Each set of contacts 37R, 37T of the new pair switch 37 is connected in parallel across the respective set of contacts 33R, 33T of the charge switch and its associated impedances L, R.

In the preferred embodiment, the switches are solid state, electro-optical devices. Each switch is driven by a single solid switch driver 33A, 35A, 37A. The switch drivers are light emitting diodes that are connected between a supply voltage and input terminals on a microprocessor 39.

The microprocessor 39 is connected to a modem 41 for communicating with the other unit. The modem 41 is connected to the data cord 29. Also connected to the microprocessor 39 is a display 43 and a keyboard 45. The display 43 presents information to an operator of the unit, while the keyboard 45 allows an operator to input data into the microprocessor. The microprocessor 39 includes ROM elements, RAM elements and interface elements.

There is provided a carrier amplitude measuring circuit 46 connected to the black cord 23 and the microprocessor 39. This circuit 46 measures the carrier amplitude between the ring and the tip connectors of the old pair 13.

The operation of the system 11 will now be described with reference to both FIGS. After the locations A and B along the old cable pair have been identified by field technicians, the first unit 17 is placed at location A and the second unit 19 is placed at location B. Then, the field technician operating the first unit 17 connects the respective ground wire 31 to a good ground. Likewise, the field technician operating the second unit 19 connects the respective ground wire to a good ground. The red cord 25 of each unit is connected by the field technician to the old pair 13 such that the red ring connection lead 25R is connected to the ring conductor 13R of the old pair and the red tip connection lead 25R is connected to the old pair tip conductor 13T.

The black cord 23 of each unit is also connected to the old pair but at a location that is determined by the respective red pair and the other unit. The respective black cord is connected to the old pair on the side of the respective red cord that is furthest away from the other unit, as shown in FIG. 1. Thus, for the first unit 17, the red cord 25 is located closer to the second unit 19 than is the black cord 23. For the second unit, the red cord is located closer to the first unit than is the black cord. The black ring connection lead 23R is connected to the ring conductor 13R of the old pair and the black tip connection lead 23T is connected to the tip old pair conductor 13T.

The white cord 27 of each unit is connected to the new pair 15 such that the white ring connection lead 27R is connected to the ring conductor 15R of the new pair and the white tip connection lead 27T is connected to the new pair tip conductor 15T. The data cord 29 of each unit is connected to a data, or spare, pair 67 such that the data ring connection lead 29R is connected to the ring conductor 67R of the data pair and the data tip connection lead 29T is connected to the tip conductor 67T of the data pair.

When the units 17, 19 are connected to the old and new pairs, the charge and new pair switches 33, 37 are open and the old pair switch 35 is closed.

After the red, black, white and data cords have been connected for each unit, each field technician inputs this information into the microprocessor 39 of his unit by way of the keyboard 45. This can be a simple "go" keystroke. When a field technician inputs the information into his respective unit, that unit sends a message to the other unit along the data pair 67. The message informs the receiving unit that the transmitting unit is connected and is ready for the next step. Which ever unit is the first unit to send the ready message is designated as the control unit. The other unit is designated as the remote unit. The designation of control and remote units allows the first and second units to cooperate with each other. The system waits until both units are connected to the pairs before proceeding with the next step. When both units are connected, various conventional tests are made to ensure that the first and second units are connected to the same old pair 13 and the same new pair 15 and that the connections made by the black, red, white and data cords are electrically satisfactory.

Once the pairs and connections to the pairs have been verified, the system is ready to begin switching telephone service from the old pair to the new pair. With the old pair switch 35 closed, the old pair 13 is cut first at one location A and then at the other location B. At each location, the old pair is cut between the black and red cords 23, 25. Telephone service is maintained in the old pair at each location through the black cord 23, the closed old pair switch 35 and the red cord 25, which form a respective bridge across each of the cuts. After the cuts have been made at each location, each field technician inputs this information into the respective microprocessor by way of the keyboard 45.

After the cords 23, 25, 27, 29 have been connected and verified, the new pair 15 is automatically charged by the system 11 to the same dc voltage level as the old pair 13. The new pair can be charged before, during or after the old pair is cut by the technicians. However, the new pair is charged before switching the telephone circuit onto the new pair. Charging occurs by the control unit closing its charge switch 33. Switch closure is performed by the microprocessor 39 in the control unit providing a low voltage on the cathode end of the charge switch driver 33A. This allows the tip and ring conductors of the new pair to be charged by the tip and ring conductors of the old pair, through the respective impedances R, L which are large enough to block the carrier frequency from the new pair. The control unit waits a predetermined amount of time to charge the new pair, whereupon charging is complete. This predetermined amount of time is chosen as being several times longer than the longest envisioned charge time.

In addition to charging the new pair after the cords have been connected and verified, the system 11 automatically determines the direction of data flow through the old pair. This is performed by using the carrier amplitude measuring circuit 46 in each unit. The carrier amplitude measuring circuit 46 in the first unit 17 measures the ac voltage of the carrier amplitude across the ring and the tip of the old pair 13 at the location A. Likewise, the carrier amplitude measuring circuit 46 in the second unit 19 makes a similar measurement at location B. The non-control unit transmits its measurement to the control unit over the data pair, wherein the control unit compares the two measurements. The comparison is performed in the microprocessor of the control unit. The larger amplitude measurement indicates the upstream location of the circuit. The unit that measured the larger carrier amplitude in the old pair is designated as the upstream unit for purposes of transferring that particular old pair. The system recognizes that the voltage amplitude of the carrier becomes attenuated as the carrier propagates along a conductor. Thus, the lower amplitude measurement is obtained from the downstream end. The determination of the upstream unit can occur before, during or after the cutting of the old pair, but before the transfer of the telephone circuit from the old pair to the new pair.

After the old pair has been cut at both locations, the new pair has been charged and the upstream end has been identified, switching the telephone circuit from the old pair to the new pair can occur. The system 11 automatically switches the telephone circuit from the old pair to the new pair using the following steps. First, the upstream unit (for the following explanation, the upstream unit is defined as the first unit 17) opens its old pair switch 35 to effectively cut off the old pair 13. At the same instant of time that the old pair switch is opened, the new pair switch 37 of the first unit 17 is closed to connect the new pair. The first unit microprocessor 39 controls the operation of the old pair and new pair switches 35, 37 through the switch drivers 35A, 37A such that the old pair switch 35 opens and the new pair switch 37 closes at the same instant of time (or when reversing a transfer, the old pair switch closes and the new pair switch opens at the same instant of time). This coordinated operation of the two switches minimizes open circuit time and thereby minimizes loss of data in the telephone circuit. Furthermore, the use of solid state switches 35, 37 permits precise control of switching because solid state switches do not exhibit any contact bounce as do conventional relays. The microprocessor of the second or downstream unit 19 opens its old pair switch and closes its new pair switch to make the downstream transfer from the old pair to the new pair. The second unit microprocessor controls the second unit or downstream switches in the same manner that the first unit microprocessor controls the upstream switches so that the downstream old pair and new pair switches are operated at the same instant of time.

The upstream and downstream units are synchronized to ensure that the downstream unit switches when the first bit of data on a new pair arrive at the downstream unit switches (this being the same time that the last bits of data on the old pair arrive at the downstream unit switches). Synchronization of the units is achieved by communicating between the upstream and downstream units over the data pair 29 and also by accounting for delays encountered in communicating between the units.

Communicating between the upstream and downstream units is accomplished by the control unit sending a switching signal over the data pair 29 to the remote unit, regardless of whether the control unit is the upstream unit or the downstream unit. Thus, the control unit microprocessor communicates with the remote unit microprocessor. The transmission of the switching signal by the control unit initiates a countdown of a first predetermined switching time by the control unit microprocessor. Upon the expiration of this first switching time, the control unit switches from the old pair to the new pair. Receipt of the switching signal by the remote unit initiates a countdown of a second predetermined switching time by the remote unit microprocessor. Upon the expiration of this second switching time, the remote unit switches from the old pair to the new pair.

The switching signal is sent before any actual switching takes place. The predetermined switching times are sufficiently long so as to allow communication between the units before actual switching begins.

The respective switching times are based on identical base times (the control unit base time being equal to the remote unit base time). The individual base times are then increased or decreased to obtain the respective first and second switching times for each unit. The increases or decreases to the base times are made to account for the delays in sending the switching signal from the control unit to the remote unit and also to account for the direction of data flow on the old pair between the control and remote units.

The switching signal is subjected to propagation delay and also to switching delay as it is sent from the control unit to the remote unit. Propagation delay includes the amount of time that the switching signal traverses the data pair from the control unit to the remote unit. The longer the data pair, then the longer the propagation delay. The propagation delay is calculated from the length of the data pair. The line length is measured by one of the units using a conventional capacitance measurement of the data pair, wherein the data pair is charged with a known voltage and then allowed to discharge, with the discharge current being measured.

The switching delay includes the time required for the respective microprocessor to physically cause the switches to switch. Switching delay is accounted for because it is unlikely that the control and remote units would have equal switching delays due to manufacturing tolerances in the electronic components. The switching delay of each unit is measured by the microprocessor upon initial powering up of the unit.

Once the delays have been determined by the units and the direction of data flow on the old pair has been determined by the carrier amplitude measuring circuits, then the adjustments to the control and remote base times are made. The adjustments are made by either adding or subtracting the delays to the base times. For example, the switching delays of each unit are subtracted from the base time of each unit. Thus, if the base time of each unit is 10 milliseconds, the switching delay of the control unit is 1 millisecond and the switching delay of the remote unit is 0.5 milliseconds, then the control unit base time would be adjusted to 9 milliseconds and the remote unit base time would be adjusted to 9.5 milliseconds. The propagation delay is then either added or subtracted to the adjusted base time to obtain the respective first and second switching times. Whether the propagation delay is added as opposed to being subtracted to the adjusted base times depends on whether the respective unit is the control unit or the remote unit and whether the respective unit is the upstream unit or the downstream unit.

The system of the present invention utilizes the direction of data flow and propagation time of a signal to minimize the loss of data. When the upstream or first unit 17 switches to the new pair, there is still data in the old pair 14 between locations A and B. Switching to the new pair at the upstream location creates an end to the data travelling on the old pair 14 to the downstream location. By switching the upstream end first, the system allows that portion of the old pair 14 which is to be taken out of service to empty its data, thus preserving this data. The data passes through the second unit by way of the old pair switch 35 and onto that portion of the old pair that is still in service. The first bits of telephone data on the newly switched new pair 15 and the last bits of data (the end of the data) on the old pair 14 arrive at the second unit 19 at the same time. This is because of the coordination in switching the old pair switch and the new pair switch in the upstream unit to eliminate any open circuit time. The first bits of data on the new pair are undistorted because the new pair is precharged to the same dc level as the old pair. Precharging the new pair also avoids any transients from occurring in the electronics interfacing with the new pair, thereby further minimizing disruption of the data signal. Just as the last bits of the telephone data are exiting the old pair 14 at location B, the beginning bits of the telephone data on the new pair are entering the new pair switch of the second unit. The old pair and new pair switches are operated at the same time to transfer the circuit from the cutoff old pair 14 to the new pair 15 with a minimal amount of data loss.

After the telephone circuit has been transferred from the old pair 14 to the new pair 15, the connections are again tested and verified to ensure that telephone service is not being disrupted. The first and second units perform this testing automatically. If the verification tests fail, the system retransfers the data from the new pair 15 to the old pair 14. Transfer occurs at the upstream end first and with the second and third switches operating at the same time. The technicians can take corrective action and then transfer again to the new pair.

After the connections have been verified, the units inform the technicians that splicing can now occur. The new pair 15 is permanently spliced to that portion of the old pair 13 which is still in operation. At each location, the technician splices the new pair to the old pair across the black and white cords 23, 27. After the splices have been made, the units test the splices and the technician at each location disconnects the cords from the wires to disconnect the respective unit.

The system can then be used to transfer another circuit from another old pair extending between the same locations A, B. For this other old pair, the upstream end may be at location B. In this case, after measuring the carrier amplitude, the second unit 19 may be designated as the upstream unit and the first unit 17 may be the downstream unit. Thus, the first and second units are designated as upstream and downstream according to the direction of data flow on the particular old pair that is being transferred. When the old pair changes to another set of conductors, the upstream and downstream units are assigned accordingly. The upstream unit switches first to allow the old pair to empty its data.

The foregoing disclosure and the showings made in the drawings are merely illustrative of the principles of this invention and are not to be interpreted in a limiting sense.

We claim:

1. A method for transferring a special telephone circuit between first and second locations from a first set of conductors to a second set of conductors, with said first set of conductors carrying data thereon, said first and second sets of conductors extending between said first and second locations, comprising the steps of:
   a) at said first location, connecting a first location switch in parallel with a first portion of said first set of conductors which is to be cut and connecting said first location switch between said first and second sets of conductors;
   b) at said second location, connecting a second location switch in parallel with a second portion of said first set of conductors which is to be cut and connecting said second location switch between said first and second sets of conductors;
   c) routing said data on said first set of conductors through said respective switches at each of said locations;
   d) determining the direction of data travel between said first and second locations along said first set of conductors so as to determine which of said first and second locations is an upstream location and which of said first and second locations is a downstream location, said upstream location having an upstream switch that is whichever one of said first and second location switches that is located at said upstream location, said downstream location having a downstream switch that is the other of said first and second location switches located at said downstream location;
   e) switching said upstream switch first so as to transfer said circuit from said first set of conductors extending to said downstream location to said second set of conductors extending to said downstream location, said upstream location transfer creating an end to said data travelling on said first set of conductors extending to said downstream location; and then
   f) determining when said end of data on said first set of conductors arrives at said downstream location, wherein when said end of data arrives switching said downstream switch so as to transfer said circuit from said first set of conductors extending to said upstream location to said second set of conductors extending to said upstream location.

2. The method of claim 1 wherein said step of determining the direction of data travel along said first set of conductors further comprises the steps of:

a) measuring the amplitude of a carrier carrying said data on said first set of conductors at both of said first and second locations;
   b) comparing the measured amplitude from the first location with the measured amplitude from the second location to determine which amplitude is larger; and
   c) designating the location with the larger amplitude as said upstream location.

3. The method of claim 1 further comprising the step of charging said second set of conductors to a dc voltage level of said first set of conductors before transferring said special telephone circuit from said first set of conductors to said second set of conductors.

4. The method of claim 3 wherein said step of charging said second set of conductors occurs through an impedance that blocks the transfer of said data to said second set of conductors.

5. The method of claim 1 wherein said first location switch comprises a first location first switch connected in parallel to said first portion of said first set of conductors and a first location second switch connected between said first and second sets of conductors, and said second location switch comprises a second location first switch connected in parallel to said second portion of said first set of conductors and a second location second switch connected between said first and second sets of conductors, said method further comprising the steps of coordinating, at said first location, the operation of said first location first switch and said first location second switch when transferring said special telephone circuit by opening said first location first switch at the same time that said first location second switch is closed and of coordinating, at said second location, the operation of said second location first switch and said second location second switch when transferring said special telephone circuit by opening said second location first switch at the same time that said second location second switch is closed.

6. The method of claim 1 wherein the step of determining when said end of data on said first set of conductors arrives at said downstream location further comprises the steps of:
   a) sending a switch signal from said first location to said second location along a third set of conductors that extends between said first and second locations, said switch signal being sent before said upstream switch is switched;
   b) switching said downstream switch after a predetermined amount of time has elapsed from the sending of said switch signal.

7. The method of claim 6 further comprising the step of determining said predetermined amount of time by selecting a base time and adjusting said base time with a propagation delay occurring on said third set of conductors between said first and second locations.

8. The method of claim 1 further comprising the steps of:
   a) charging said second set of conductors to a dc voltage level of said first set of conductors before transferring said special telephone circuit from said first set of conductors to said second set of conductors;
   b) said first location switch comprises a first location first switch connected in parallel to said first portion of said first set of conductors and a first location second switch connected between said first and second sets of conductors, and said second location switch comprises a second location first switch connected in parallel to said second portion of said first set of conductors and a second location second switch connected between said first and second sets of conductors, said method further comprising the steps of coordinating, at said first location, the operation of said first location first switch and said first location second switch by opening said first location first switch at the same time that said first location second switch is closed and of coordinating, at said second location, the operation of said second location first switch and said second location second switch when transferring said special telephone circuit by opening said second location first switch at the same time that said second location second switch is closed; and c) said step of determining the direction of data travel along said first set of conductors further comprises the steps of:
  i) measuring the amplitude of a carrier carrying said data on said first set of conductors at both of said first and second locations;
  ii) comparing the measured amplitude from the first location with the measured amplitude from the second location to determine which amplitude is larger; and
  iii) designating the location with the larger amplitude as said upstream location;

d) said step of determining when said end of data on said first set of conductors arrives at said downstream location further comprises the steps of:
  i) sending a switch signal from said first location to said second location along a third set of conductors that extends between said first and second locations, said switch signal being sent before said upstream switch is switched;
  ii) switching said downstream switch after a predetermined amount of time has elapsed from the sending of said switch signal.

9. The method of claim 1 wherein a second telephone circuit is transferred between said first and second locations from a third set of conductors to a fourth set of conductors, with said third set of conductors carrying data thereon, further comprising the steps of:
  a) after said transfer of said special telephone circuit from said first set of conductors to said second set of conductors, connecting said second set of conductors to said special telephone circuit so as to bypass said first location switch and said second location switch and then disconnecting said first location switch and said second location switch;
  b) reconnecting, at said first location, said first location switch in parallel with a first portion of said third set of conductors which is to be cut and between said third and fourth sets of conductors, and reconnecting, at said second location, said second location switch in parallel with a second portion of said third set of conductors which is to be cut and between said third and fourth sets of conductors;
  c) routing said data on said third set of conductors through said respective switches at each of said locations;
  d) determining the direction of data travel between said first and second locations along said third set of conductors so as to determine which of said first and second locations is a new upstream location and which is a new downstream location, said new upstream location having a new upstream switch that is whichever one of said first and second location switches that is located at said new upstream location, said new downstream location having a new downstream switch that is the other of said first and second location switches located at said new downstream location;
  e) switching said new upstream switch first so as to transfer said second telephone circuit from said third set of conductors to said fourth set of conductors, said new upstream location transfer creating a respective end to said data travelling on said third set of conductors to said new downstream location;
  f) determining when said respective end of data on said third set of conductors arrives at said new downstream location, wherein when said end of data arrives at said new downstream location switching said new downstream switch so as to transfer said second telephone circuit from said third set of conductors extending to said new upstream location to said fourth set of conductors extending to said new upstream location.

10. A method for transferring a special telephone circuit between first and second locations from a first set of conductors to a second set of conductors, with said first set of conductors carrying data thereon, said first and second sets of conductors extending between said first and second locations, comprising the steps of:
  a) connecting a first switch in series with an impedance and between said first and second sets of conductors;
  b) at said first location, connecting a first location second switch in parallel with a first portion of said first set of conductors which is to be cut and connecting a first location third switch between said first and second sets of conductors;
  c) at said second location, connecting a second location second switch in parallel with a second portion of said first set of conductors which is to be cut and connecting a second location third switch between said first and second sets of conductors;
  d) charging said second set of conductors to a dc voltage level of said first set of conductors by closing said first switch;
  e) after charging said second set of conductors, transferring said circuit from said first set of conductors to said second set of conductors at said first location by opening said first location second switch and closing said first location third switch, said first location second and third switches being operated at the same time;
  f) at the same time that said first location second and third switches are being operated, sending a switch signal from said first location to said second location along a third set of conductors that extends between said first and second locations;
  g) receiving said switch signal at said second location and at the same time that said switch signal is received, opening said second location second switch and closing said second location third switch so as to transfer said circuit from said first set of conductors to said second set of conductors at said second location.

11. An apparatus for transferring a special telephone circuit from a first set of conductors to a second set of conductors, comprising:
  a) a first switch structured and arranged to be connected between said first set of conductors and said second set of conductors;

b) an impedance connected in series with said first switch, said impedance being of a value that blocks said telephone circuit while passing dc;

c) a second switch structured and arranged to be connected in parallel with a portion of said first set of conductors which is to be cut;

d) a third switch structured and arranged to be connected in parallel with said first switch and said impedance;

e) means for controlling the operation of said first, second and third switches, said means for controlling being coupled with said first, second and third switches, said means for controlling initially closing said second switch while opening said first and third switches so as to route said telephone circuit through said second switch, said means for controlling then closing said first switch so as to charge said second set of conductors with a dc voltage appearing on the first set of conductors, said means for controlling then closing said third switch and opening said second switch at the same time so as to transfer said special telephone circuit from said first set of conductors to said second set of conductors.

12. The apparatus of claim 11 wherein said first, second and third switches each comprise solid state switches.

13. The apparatus of claim 12 wherein said means for controlling comprises a digital processor.

14. A system for transferring a special telephone circuit between first and second locations from a first set of conductors to be a second set of conductors, comprising:

a) a first unit located at said first location along said first and second set of conductors and a second unit located at said second location along said first and second sets of conductors;

b) said first unit comprising:
  i) a first location switch connected in parallel with a respective portion of said first set of conductors which is to be cut at said first location and also connected between said first set of conductors and said second set of conductors at said first location;
  ii) means for controlling said first location switch so as to transfer said special telephone circuit from said first set of conductors to said second set of conductors;

c) said second unit comprising:
  i) a second location switch connected in parallel with a respective portion of said first set of conductors Which is to be cut at said second location and also connected between said first set of conductors and said second set of conductors at said second location;
  ii) means for controlling said second location switch so as to transfer said special telephone circuit from said first set of conductors to said second set of conductors;

d) means for determining which of said first or second locations is an upstream location relative to data flow in said first set of conductors and which of said first or second locations is a downstream location relative to data flow in said first set of conductors;

e) means for operating whichever one of said means for controlling said first location switch and said means for controlling said second location switch that is located at said upstream location first before operating whichever other one of said means for controlling said first location switch and said means for controlling said second location switch that is located at said downstream location, so as to transfer said telephone circuit at said upstream location first before transferring said telephone circuit at said downstream location.

15. The system of claim 14 wherein said means for operating further comprises means for transmitting a signal along a third set of conductors from said first location to said second location before the means for controlling said first location switch located at said first location operates said first location switch located at said first location, and said means for operating further comprises means for receiving said signal from said third set of conductors at said second location, said means for receiving being coupled to said means for controlling said second location switch located at said second location, wherein said means for controlling said second location switch at said second location operates said second location switch at said second location after a predetermined amount of time has elapsed from the sending of said signal.

16. The system of claim 14 wherein:

a) said first location switch comprises a first switch connected in parallel with said portion of said first set of conductors which is to be cut at said first location and a second switch connected between said first set of conductors and said second set of conductors at said first location;

b) said means for controlling said first location switch initially closes said first switch and opens said second switch so as to route said telephone circuit through said first switch, and said means for controlling said first location switch then simultaneously opens said first switch and closes said second switch so as to switch said telephone circuit from said first set of conductors to said second set of conductors at said first location;

c) said second location switch comprises a third switch connected in parallel with said portion of said first set of conductors which is to be cut at said second location and a fourth switch connected between said first set of conductors and said second set of conductors at said second location;

d) said means for controlling said second location switch initially closes said third switch and opens said fourth switch so as to route said telephone circuit through said third switch, and said means for controlling said second location switch then simultaneously opens said third switch and then closes said fourth switch so as to switch said telephone circuit from said first set of conductors to said second set of conductors at said second location.

17. The system of claim 16 wherein one of said first and second units further comprises a fifth switch connected in parallel with one of said second switch and said fourth switch and an impedance connected in series with said fifth switch, with one of said means for controlling said first location switch and said means for controlling said second location switch also controlling said fifth switch so that said fifth switch is closed to charge said second set of conductors to the same dc level as said first set of conductors before switching said telephone circuit from said first set of conductors to said second set of conductors.

18. The system of claim 14 wherein said means for determining which of said first or second locations is an upstream location comprises a means for measuring carrier amplitude in each of said first and second units.

19. The system of claim 14 wherein:
a) said means for operating further comprises means for transmitting a signal along a third set of conductors from said first location to said second location before the means for controlling said first location switch located at said first location operates said first location switch located at said first location, and said means for operating further comprises means for receiving said signal from said third set of conductors at said second location, said means for receiving being coupled to said means for controlling said second location switch located at said second location, wherein said means for controlling said second location switch at said second location operates said second location switch at said second location after a predetermined amount of time has elapsed from the sending of said signal;
b) said first location switch comprises a first switch connected in parallel with said portion of said first set of conductors which is to be cut at said first location and a second switch connected between said first set of conductors and said second set of conductors at said first location;
c) said means for controlling said first location switch initially closes said first switch and opens said second switch so as to route said telephone circuit through said first switch, and said means for controlling said first location switch then simultaneously opens said first switch and closes said second switch so as to switch said telephone circuit from said first set of conductors to said second set of conductors at said first location;
d) said second location switch comprises a third switch connected in parallel with said portion of said first set of conductors which is to be cut at said second location and a fourth switch connected between said first set of conductors and said second set of conductors at said second location;
e) said means for controlling said second location switch initially closes said third switch and opens said fourth switch so as to route said telephone circuit through said third switch, and said means for controlling said second location switch then simultaneously opens said third switch and then closes said fourth switch so as to switch said telephone circuit from said first set of conductors to said second set of conductors at said second location.
f) one of said first and second units further comprises a fifth switch connected in parallel with one of said second switch and said fourth switch and an impedance connected in series with said fifth switch, with one of said means for controlling said first location switch and said means for controlling said second location switch also controlling said fifth switch so that said fifth switch is closed to charge said second set of conductors to the same dc level as said first set of conductors before switching said telephone circuit from said first set of conductors to said second set of conductors;
g) said means for determining which of said first or second locations is an upstream location comprises a means for measuring carrier amplitude in each of said first and second units.

20. An apparatus for use in transferring a special telephone circuit from a first set of conductors to a second set of conductors, comprising:
a) a third set of conductors adapted to be connected to said first set of conductors;
b) a fourth set of conductors adapted to be connected to said first set of conductors;
c) a fifth set of conductors adapted to be connected to said second of conductors;
d) a first switch connected in series between said third set of conductors and said fifth set of conductors;
e) an impedance connected in series with said first switch, said impedance passing dc while blocking a carrier on said first set of conductors;
f) a second switch connected in series between said third set of conductors and said fourth set of conductors;
g) a third switch connected in parallel across said first switch and said impedance;
h) a processor coupled with said first, second and third switches, said processor controlling the operation of said first, second and third switches;
i) a modem coupled with said processor, said modem also coupled with a sixth set of conductors;
j) an input device and an output device, both of which are connected to said processor;
k) a carrier amplitude measuring circuit adapted to be connected to said first set of conductors through either said third set of conductors or said fourth set of conductors, and connected to said processor.

* * * * *